(12) United States Patent
Azagury et al.

(10) Patent No.: US 6,487,714 B1
(45) Date of Patent: Nov. 26, 2002

(54) MECHANISM FOR DYNAMIC SELECTION OF AN OBJECT'S METHOD

(75) Inventors: Alain Charles Azagury, Nether (IL); Michael Factor, Haifa (IL); Avi Teperman, Haifa (IL); Sara Porat, Ramat Yishay (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/317,421

(22) Filed: May 24, 1999

(51) Int. Cl.[7] ............................................. G06F 9/44
(52) U.S. Cl. ................. 717/116; 717/154; 717/165; 709/332
(58) Field of Search ................. 717/108, 140, 717/151, 153, 158, 116, 165; 709/217, 332

(56) References Cited

U.S. PATENT DOCUMENTS

| | | | | |
|---|---|---|---|---|
| 5,421,016 A | * | 5/1995 | Conner et al. | 395/700 |
| 5,632,034 A | * | 5/1997 | O'farrell | 717/140 |
| 5,898,834 A | * | 4/1999 | Sharpe et al. | 395/200 |
| 6,223,340 B1 | * | 4/2001 | Detlefs | 717/108 |
| 6,272,674 B1 | * | 8/2001 | Holiday, Jr. | 717/174 |
| 6,295,643 B1 | * | 9/2001 | Brown et al. | 717/148 |
| 6,360,361 B1 | * | 3/2002 | Iaurus et al. | 717/159 |

OTHER PUBLICATIONS

Derwent Information LTD, Apr. 27, 1999.*
SOMobjects Developer Toolkit User Guide ©1993, pp. 1–5,2–2—2–4,2–16,3–8,3–9,3–18,3–21,3–27,4–3,4–22, 6–21,6–22,6–54,8–40,–8–41.*
Developing Enterprise Applications With JavaTm 2 Platform Enterprise Edition ©1998.*

* cited by examiner

Primary Examiner—Tuan Q. Dam
Assistant Examiner—Chuck Kendall
(74) Attorney, Agent, or Firm—Browdy and Neimark, P.L.L.C.

(57) ABSTRACT

A data structure and associated mechanism for implementing object oriented programming language, comprising at least two code blocks for at least one method of an object of a specified class, each of the code blocks containing a different implementation of the at least one method. An access mechanism is provided for accessing a desired code block at run-time on a per object instance basis so as to allow selection of a desired implementation of the at least one method without requiring instantiation of an object of a different class. The selection of which implementation to invoke is integrated into an existing invocation method of the language and is thus transparent to a calling application invoking the method.

27 Claims, 2 Drawing Sheets

MECHANISM FOR DYNAMIC SELECTION OF AN OBJECT'S METHOD

FIELD OF THE INVENTION

This invention relates to object-oriented programming and particularly to an object's method execution during run-time.

BACKGROUND OF THE INVENTION

In class-based Object orientated Programs such as C++ and Java, a "class" is a template that defines an object's methods and variables. A class can have sub-classes that can inherit some or all of the characteristics of the class. Sub-classes can defines new methods that are not themselves defined in the parent class. It is sometimes desirable to have different implementations of an object's methods within a single system where the choice of implementation depends upon various dynamic run-time, attributes, e.g. different implementations for sparse and dense matrices. To some extent, this can be achieved by sub-classing; however, sub-classing cannot be used to change the behavior of an existing object. Further, sub-classing requires explicit programmer action to determine the type of object to create.

By way of specific example, consider distributed object-based systems that often use proxies to represent remote objects. When a client invokes a method on the proxy, the code found at the method's entry in the virtual method table will redirect the invocation to the master object at the server. Proxies can perform various types of caching; however, all instances of a proxy for a particular class of remote object perform the same caching algorithm. In addition, proxies are not transparent to the programmer: a user can typically tell the difference between the run-time type of the proxy and the master object (if the language being used allows determination of an object's run-time type). Further, if an object migrates, the source node cannot continue using its existing references to the object; changing the implementation of an object from master to proxy requires changing the identity of the object (as well as its run-time type) Finally, since all proxies for a given class typically execute the same code, there is no way for the system to customize the behavior of a particular instance of a proxy at run-time based upon changing resource characteristics of the executing platform.

Aspects of the problem have been addressed in the art, albeit not entirely satisfactorily. For example, the "Smalltalk" language includes the ability to exchange one object with another using the symmetric definition of the "become:" message, such that:

a become: b causes all pointers to object "a" to point to object "b", and vice versa. This is the original definition of "become:". The asymmetric or one-way definition was added later in order to preserve compatibility between older versions of Smalltalk, where object pointers were indices placed into an indirection table. The implementation of "become:" merely required swapping pointers in the table. For later implementations not based on the indirection table, the implementation of "become:" required scanning all the memory for pointers to the first object. Therefore, these later implementations generally opted for the asymmetric semantics, wherein the definition of "b" is unchanged. Thus, all pointers to object "a" will now point to object "b" and all (old) pointers to object "b" remain unchanged.

In any case, it is not clear how to ensure consistency between the two definitions in a multithreaded environment. Further, use of a specific implementation of "become" in an application is not orthogonal to the application but, rather, requires explicit programmer intervention. Also, it does not change the implementation for an existing object, but rather changes the object referred to by a particular reference. Whilst this can be used to obtain some of the effect of changing the implementation of an existing object, it requires the program explicitly to construct the new object which is to be the replacement. Finally, objects with different implementations have different run-time types.

In chapter 10 of "Advanced C++" by James O. Coplien, there is described a mechanism known as Dynamic Multiple Inheritance for dynamically setting how an object is created. The idea presented is that the implementation of the new operator contains a switch statement, which according to the value of the variable will determine which implementation to use for an object. The variable is passed to new as a parameter. By employing this mechanism, the program instantiates the required type depending on the run-time value of the variable.

However, it is to be noted that once an object is created, its implementation is fixed for the lifetime of the object. Furthermore, the manner in which the switch variable is passed to new is not transparent to the programmer who must provide the implementation for passing the desired variable. Finally, the run-time type of the object differs based upon the implementation picked by the new operator.

In the Self language, an object can change its behavior many times during run-time but in each case it is considered a different object. Unlike languages based on the use of "classes" and their "instances", Self is based on the prototype concept. In Self, a program starts with an initial set of prototype objects, which are true objects in the classical sense. An application programmer needing another object with certain properties, chooses the prototype "nearest" to the required one, copies it and changes the data slots (fields) and method slots as required. Thus, an object is not an instance of a class (prototype), but rather is a copy of a prototype or a different object altogether. In a vanilla object-oriented language like C++ or Java, the behavior of the object is fixed and all objects of the same class implement the same methods in the same way and thus exhibit the same behavior. It would clearly be desirable to adapt such a language so as to allow the behavior of an object to be changed dynamically during run-time, whilst maintaining the fact that the object is an instance of the same class all the time. At the same time, different instances of the same class having different implementations at any particular instance in time must be allowed.

SUMMARY OF THE INVENTION

It is an object of the invention to provide a data structure and associated mechanism for implementing an object oriented programming language, which allows different implementations of a method to be executed dynamically during run-time, without requiring instantiation of an object of a different class.

According to a first aspect of the invention, there is provided a data structure and associated mechanism for implementing object oriented programming language, comprising:

at least two code blocks for at least one method of an object of a specified class, each of said code blocks containing a different implementation of said at least one method, and an access mechanism for accessing a desired code block at run-time on a per object instance basis so as to allow selection of a desired implementation of said at least one method without requiring instantiation of an object of a different class;

said selection of which implementation to invoke being integrated into an existing invocation method of said language and thus being transparent to a calling application invoking said at least one method.

According to a second aspect of the invention, there is provided a method for implementing an object oriented programming language, comprising:

(a) providing at least two code blocks for at least one method of an object of a specified class, each of said code blocks containing a different implementation of said at least one method, and (b) accessing a desired code block at run-time on a per object instance basis so as to allow selection of a desired implementation of said at least one method without requiring instantiation of an object of a different class;

said selection of which implementation to invoke being integrated into an existing invocation method of said language and thus being transparent to a calling application invoking said at least one method.

The invention describes a mechanism that allows an object to behave differently at different points in time during run-time so that different method implementations can be associated with the object according to circumstances dictated, not in advance by the programmer, but rather by the environment. Thus, consider three different instances of a vector class, all of which are accessed by multiple nodes in a distributed application:

vector A: this vector is relatively small, access is in bursts and at any given time localized to a thread, and the accesses involve a mixture of reads and writes;

vector B: this vector is relatively large, the accesses are sparse and not localized to a single thread at any given time, and the accesses involve a mixture of reads and writes;

vector C: this vector is relatively large, after a period of initialization all of the accesses are read-only, and the accesses are continuous and not localized to a single thread.

It seems fairly clear that different implementations would be required for each of the three cases to give optimal performance. For vector A, a caching proxy is needed which allows only exclusive caching; for vector B, a simple proxy which remotes all accesses should be used; whilst for vector C there is required a proxy that supports multiple readers, single writers. The invention provides a mechanism that allows different implementations to be defined on a per object instance basis.

Thus, the invention allows for only a single vector to be defined in the application but for that single vector to behave like vector A or vector B or vector C at different points in its life. This is made possible, according to the invention, by allowing the behavior of the proxies for the given vector object to be changed, after the vector object is created, based for example upon run-time profiling information.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
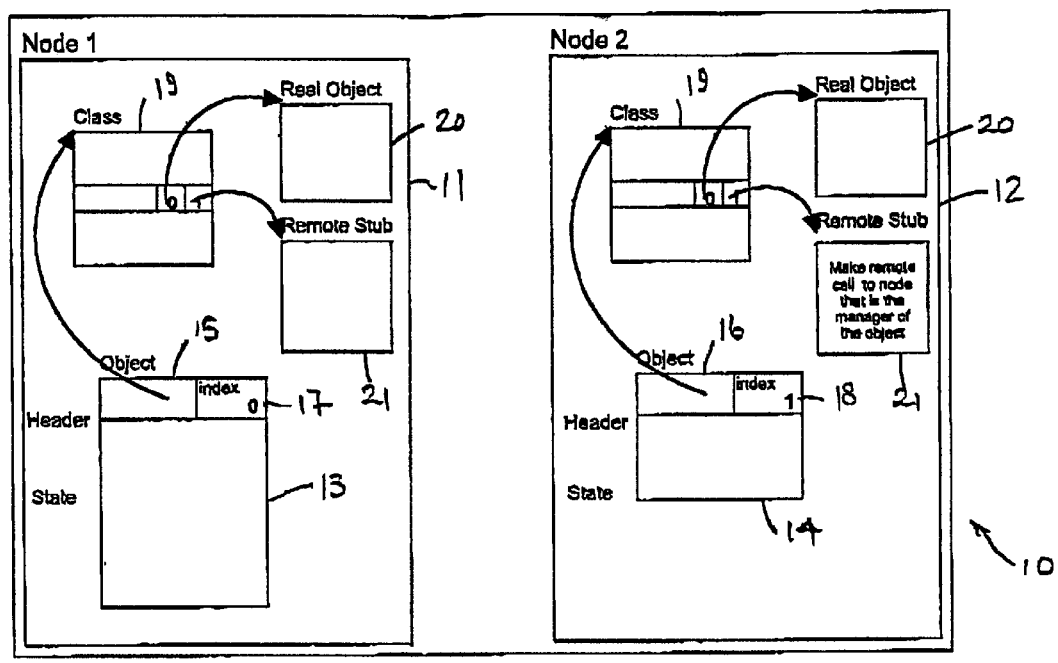
FIG. 1 is a pictorial representation of an object architecture for allowing multiple implementations for a method of the object.

FIG. 1 shows an object architecture relating to a distributed object system depicted generally as 10 comprising nodes 11 and 12 each having respective objects 13 and 14. Each object has a respective header 15 and 16 containing a respective index 17 and 18. The object 13 is defined by the programmer and is referred to as a master object, whilst object 14 is a proxy. The node 11 in the distributed system 10 where the master object 13 is located is referred to as the manager. Proxies fall into two or more categories, of which two are described for the sake of explanation. A simple proxy redirects all method invocations and field accesses to the node 11 where the master object 13 is located and invokes the method on the master object 13. In contrast, a caching proxy is an implementation that is customized (not necessarily by the programmer) for the particular class and selected for a particular instance in the sense that it performs some caching or replication to enable it to respond to a method invocation or field access without any indirection. There can be multiple types of caching proxies for any particular class. A stub refers to all the methods for a proxy and can be simple (i.e. the stub of a simple proxy) or caching (i.e. the stub of a caching proxy). Other types of proxy, too, can take advantage of the invention.

Associated with the master object 13 and the proxy object 14 is a common class 19 which defines a plurality of different methods. For the sake of example, consider a method for which two different implementations are required. In such case, the proxy implementation might be generated automatically based upon the master implementation, which is defined by the code written by the programmer. Alternatively, the programmer might provide both implementations by employing a mechanism outside the scope of the invention. Associated with such a method for which different behavior is, or may be required during run-time, is a separate code block 20 and 21 each defining a different implementation of the method. The object headers 15 and 16 of both the master object 13 and the proxy object 14 point to copies of the same class 19. The class 19 contains an array of implementations: the implementation at offset zero is for the master and points to the code block 20, whilst the implementation at offset one is for the proxy and points to the code block 21. The index 17 in the object header 15 in the manager node 11 contains zero, indicating that the master code block 20 should be used. The index 18 in the object header 16 in the proxy node 12 contains one, indicating that the proxy code block 21 should be used thus making a remote call to the node 11 which is the manager of the object.

The value of the index 17 or 18 is set when the respective object 13 or 14 is created but can be modified during the life of the object, based upon the observed and predicted usage of the object. It is assumed that this value can be changed at run-time via an atomic write; a particular set of implementations may want to constrain changing this value to occur only if there are no active methods executing on the instance. The mechanism defined by the invention does not itself architecture any constraints.

The index and the existence of multiple implementations are hidden from an application in the mechanisms of a method invocation. For instance, in a distributed application implemented using Java™, the logic for implementing this indirection could be embedded in the implementation of the invoke<x> instructions. As another example, for a distributed application written in C++, a compiler could generate the appropriate logic in the method invocation code.

In the architecture shown in FIG. 1; the same class object is used for various types of proxies and master, and for each of the types of code different indices are defined and are included in the appropriate object header. Since the same class object is used for multiple implementations, functions that look at the run-time type of an object, hide from the program the presence of multiple implementations.

A variant of this design is to store in the object header the pointer to the appropriate method table instead of the index. At method invocation time, the pointer is used to go directly to the appropriate virtual method table, saving the indirection through the class and the array of virtual method tables. The pointer to the appropriate virtual method table is in addition to the pointer to the class object which is required for other operations. For example, in Java™, it is required for run-time determination of an object's type. The overhead of the duplicate pointers in the object header—one for the class and one for the method table—can be saved by adding a reference from the method table to the class object.

The benefit of such an approach is that it should speed up method invocation; the drawback is that it requires more memory in the object header. Instead of an index whose size is bounded by the number of distinct implementations of stubs for a given class, it is bounded by the size of a reference (i.e. pointer).

Figure 2:
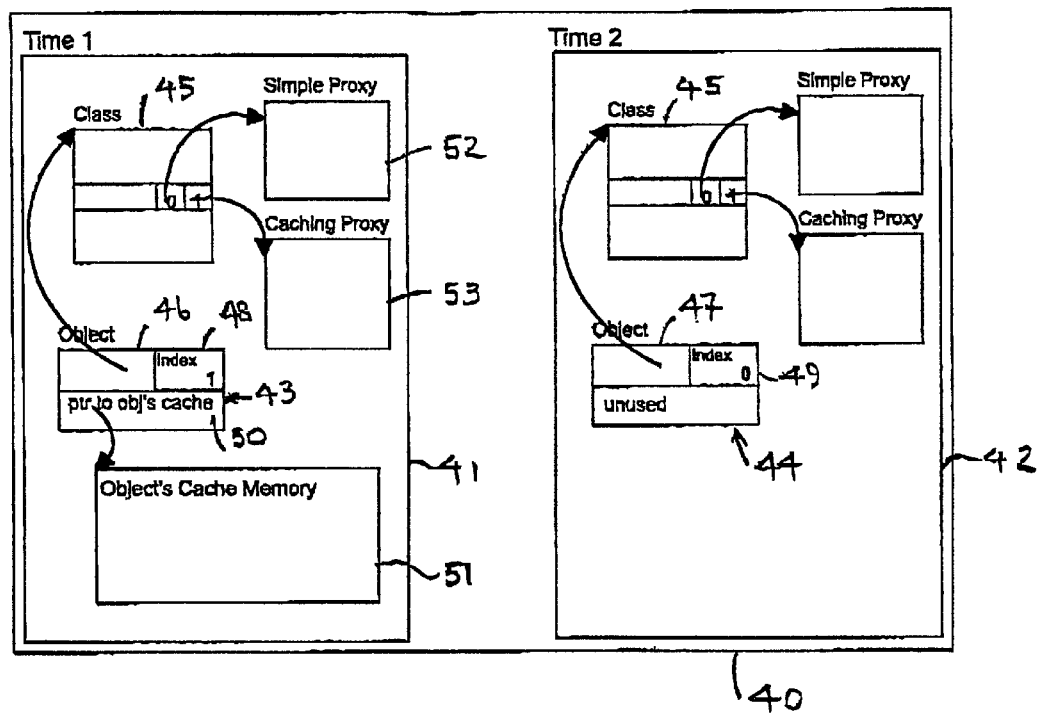
FIG. 2 is a pictorial representation of an object architecture for allowing multiple implementations for a method of the object depending on system resource constraints.

FIG. 2 shows an object architecture relating to a resource constrained device depicted generally as 40 to choose the appropriate implementation of a particular object's methods based upon current resource tradeoffs. Consider two instances of time depicted 41 and 42 whereat there are implemented respective objects 43 and 44 each based on a common class 45. Each object has a respective header 46 and 47 containing a respective index 48 and 49. The object 43 further includes a pointer 50 to a cache memory 51, this being absent from the object 44.

The class 45 contains an array of implementations: the implementation at offset zero points to a simple proxy 52, whilst the implementation at offset one points to a caching proxy 53. The index 48 in the object header 46 contains zero, indicating that the simple proxy 52 should be used. The index 49 in the object header 47 contains one, indicating that the caching proxy.

The invention thus allows the device 40 to change the implementation of the object 43 or 44 dynamically. For example, at the first instance of time 41, the device 40 is communication constrained and thus uses the caching proxy 53 that references a large region of memory 51 for caching purposes. Later, at time 42, it is decided that the device 40 is memory constrained and no longer communication constrained. The manner in which such a decision is arrived at is not itself a feature of the present invention. The object's implementation is simply changed to the simple proxy 52 which remotes all calls, but has much smaller memory requirements. When the implementations are switched, the buffer that had been used for caching while the device was communication constrained can be released.

Figure 3:
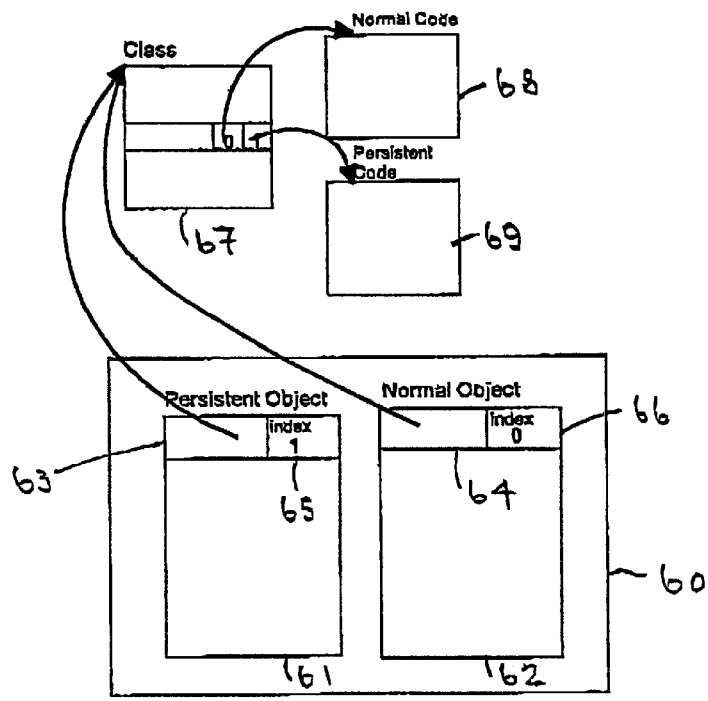
FIG. 3 is a pictorial representation of an object architecture for allowing multiple implementations for a method of the object depending on pragmatic attributes associated with the object.

FIG. 3 shows an object architecture depicted generally as 60 allowing the definition of different pragmatic attributes (e.g. security, encryption, etc.) on different instances of the same object. The use of different implementations for the methods of a class can allow the determination of the pragmatic behavior on a per object instance behavior. In addition, it allows tighter integration between the code implementing the pragmatics and the code providing the semantics.

One possible use in the context of object-oriented languages is to support persistent objects, e.g. where persistence is defined by reachability. Instead of designing objects to support persistence properties throughout their entire lifetime-incurring overhead for instances which are never made persistent-the invention allows the system to tailor the object's behavior according to its real functionality.

There is thus shown a persistent object 61 and a normal object 62 each having a respective object header 63 and 64 containing a respective index 65 and 66. Both objects 61 and 62 are based on a common class 67 containing an array of implementations: the implementation at offset zero is for the normal code and points to a code block 68. The implementation at offset one is for the persistent code and points to a code block 69. The index 65 in the object header 63 in the persistent object 61 contains one, indicating that the persistent code block 69 should be used. The index 66 in the object header 64 in the normal object 62 contains zero, indicating that the normal code block 68 should be used.

The normal code block 68 defines the method implementation for normal (non-persistent) behavior. The persistent code block 69 contains code that is modified to support persistent objects. This can include code that upon each method invocation retrieves the object's state from a database and after each invocation updates the object's state as stored in the database.

It will be understood that essentially the same approach is used as for the distributed scenario described above with reference to FIG. 2. As in the distributed case, there are multiple ways of organizing the indirection to the appropriate implementation. Thus, FIG. 3 shows a particular approach using an array of virtual method tables along with an index in the object's header. In such case, as in the distributed case shown in FIG. 2, the indirection is hidden in the implementation of the method invocation mechanism via the index in the object header. However, other implementations are possible such as the use of pointers to point directly to the required code block. Whichever implementation is used, when the object is made persistent, the system changes its implementation from the normal code to the persistent code.

Figure 4:
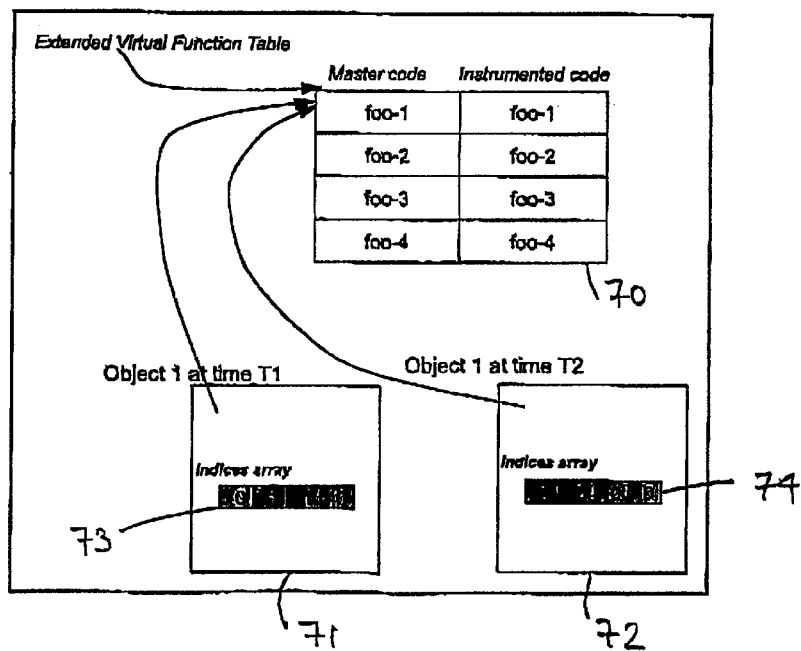
FIG. 4 is a pictorial representation of an extended virtual function table of an object's class.

FIG. 4 shows pictorially a generalized embodiment of the invention as provided by an extended virtual function table 70 used for dynamic testing of program code. Test coverage information is provided by activating instrumented code that performs actions such as manipulating variables that show accumulated values, such as "how many times each program block is executed". Testing is a significant challenge in software engineering, particularly in the realm of object-oriented programming. One reason this is such a complicated task is due to the large amount of information required. It is desirable to allow a test coverage tool to control dynamically which methods should be activated in the instrumented code, while leaving others in their raw form. The invention in its generalized form supports this dynamic functionality.

Further, since in an object-oriented languages the same implementation class can be used for multiple purposes, e.g.

a hashtable can be used to implement an object cache, to provide a facility for looking up name-value pairs, etc. In such cases, there is a need to measure coverage for code executed on/by specific objects and not just in coverage of the code. For example, if there is produced test coverage for the hashtable code, this does not indicate whether it were tested as part of the object cache or as part of the name-value pair facility.

In the extended virtual function table 70, each method in the class has two possible implementations; one is the master implementation as provided by the programmer, and the other is the instrumented implementation. The instrumented implementation is derived from the master implementation and, when executed, generates coverage information (e.g. branches taken, caller-callee pair data, etc.)

FIG. 4 shows two instances of time depicted 71 and 72 whereat there is implemented an object having an array of indices shown respectively for each instance as 73 and 74. Each index in each array corresponds to a particular method of the object's class and has the value 0 or 1, referring either to the master implementation or to the instrumented implementation, respectively. If the array at index i has the value 1 at a certain instance of time, then a call to the associated $i^{th}$ method would generate test coverage information. If at some later point in time, the system decided to cease collecting coverage data on method i for a particular object, it can change the value in the $i^{th}$ entry of the array to be zero.

In the specific example shown in the figure, each array has four indices each relating to a corresponding entry in the extended virtual function table. At the first instance of time 71, the second and third indices are set to 1 and foo-2 and foo-3 methods will therefore generate coverage information. At the subsequent time 72, only the first index is 1 and therefore only the foo-1 method generates coverage information.

In the method claims that follow, alphabetic characters used to designate claim steps are provided for convenience only and do not imply any particular order of performing the steps.

What is claimed is:

1. A computer program product comprising:
   a computer usable medium having computer readable program code embodied therein for implementing an object oriented programming language, the computer readable program code comprising:
   (a) computer readable program code in respect of at least two code blocks for at least one method of an object of a specified class, each of said code blocks containing a different implementation of said at least one method, and
   (b) computer readable program code for accessing a desired code block at run-time on a per object instance basis so as to allow selection of a desired implementation of said at least one method without requiring instantiation of an object of a different class;
   said selection of which implementation to invoke being integrated into an existing invocation method of said language and thus being transparent to a calling application invoking said at least one method.

2. The product of claim 1, wherein the program code for accessing a desired code block includes an access mechanism responsive to data external to the object for selecting the desired implementation.

3. The product of claim 2, wherein said data external to the object is a function of a system attribute or state.

4. The product of claim 3, wherein the system attribute or state relates to a system resource, thus enabling different code blocks to be executed depending on system resource constraints.

5. The product of claim 2, wherein the data external to the object is indicative of a pragmatic behavior, so as to allow different pragmatic behaviors to be associated with said method for each object that is an instance of the specified class.

6. The product of claim 1, wherein the program code for accessing a desired code block includes an access mechanism that includes a parameter per object in respect of each method of the specified class so as to allow independent selection of each method in the class for each object that is an instance of the class.

7. The product of claim 6, wherein the access mechanism is responsive to a calling program for selectively implementing a test coverage strategy in respect of one or more methods of the object.

8. The product of claim 1, wherein the program code for accessing a desired code block includes an access mechanism that allows different implementations for a method of an object to be executed at different points in the lifetime of the object.

9. The product of claim 1, wherein a first one of said code blocks relates to an implementation of the method for a master object and a second one of said code blocks relates to an implementation of the method for a proxy object, thus allowing a distributed program running on a cluster of machines to change the implementation of an object from master to proxy or vice versa during run-time in a manner which is transparent to an application invoking said method.

10. The product of claim 9, being used by a caching program for implementing different cache strategies according to an instance of the object.

11. The product of claim 1, wherein the program code for accessing a desired code block includes an access mechanism that is responsive to an optimization program for implementing different optimization strategies according to an instance of the object.

12. The product of claim 1, wherein the program code for accessing a desired code block includes an access mechanism that employs pointers to point to a desired one of the code blocks.

13. The product of claim 1, wherein the program code for accessing a desired code block includes an access mechanism that uses an index for accessing a desired one of the code blocks.

14. A program storage device readable by a machine, tangibly embodying a program of instructions executable by the machine to perform method steps for implementing an object oriented programming language, said method steps comprising:
   (a) providing at least two code blocks for at least one method of an object of a specified class, each of said code blocks containing a different implementation of said at least one method, and
   (b) accessing a desired code block at run-time on a per object instance basis so as to allow selection of a desired implementation of said at least one method without requiring instantiation of an object of a different class;
   said selection of which implementation to invoke being integrated into an existing invocation method of said language and thus being transparent to a calling application invoking said at least one method.

15. The device of claim 14, wherein step (b) includes accessing data external to the object for selecting the desired implementation.

16. The device of claim 15, wherein step (b) includes deriving said data external to the object as a function of a system attribute, state or resource constraint thus enabling different method code to be executed depending on said system attribute, state or resource constraints.

17. The device of claim 14, wherein step (a) includes defining a parameter per object in respect of each method of the specified class so as to allow independent selection of each method in the class for each object that is an instance of the class.

18. The device of claim 17, wherein step (b) includes accessing a calling program for selectively implementing a test coverage strategy in respect of one or more methods of the object.

19. The device of claim 14, wherein step (b) includes accessing different implementations for a method of an object to be executed at different points in the lifetime of the object.

20. The device of claim 14, wherein:
a first one of said code blocks relates to an implementation of the method for a master object and second one of said code blocks relates to an implementation of the method for a proxy object, and
step (b) is performed by a run-time system supporting a distributed program running on a cluster of machines to change the implementation of an object from master to proxy or vice versa during run-time in a manner which is transparent to an application invoking said method.

21. The device of claim 14, being used by a caching program for implementing different cache strategies according to an instance of the object.

22. The device of claim 14, wherein step (b) includes defining a parameter indicative of a pragmatic behavior, so as to allow different pragmatic behaviors to be associated with said method for each object that is an instance of the specified class.

23. The device of claim 14, wherein step (b) includes accessing an optimization program for implementing different optimization strategies according to an instance of the object.

24. The device of claim 14, wherein step (b) includes using pointers to point to a desired one of the code blocks.

25. The device of claim 14, wherein step (b) includes using an index for accessing a desired one of the code blocks.

26. The computer program product according to claim 1, wherein said at least two code blocks containing different implementations of said at least one method co-exist at run-time.

27. The program storage device according to claim 14, wherein said at least two code blocks containing different implementations of said at least one method co-exist at run-time.

* * * * *